(12) United States Patent
Matsumoto et al.

(10) Patent No.: US 12,407,925 B2
(45) Date of Patent: Sep. 2, 2025

(54) EVALUATION APPARATUS, EVALUATION METHOD, AND STORAGE MEDIUM

(71) Applicant: CANON KABUSHIKI KAISHA, Tokyo (JP)

(72) Inventors: Toru Matsumoto, Kanagawa (JP); Go Naito, Kanagawa (JP); Tamaki Negishi, Tokyo (JP); Ryuichiro Yasuda, Tokyo (JP); Yu Narita, Kanagawa (JP); Kosuke Kiyamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 458 days.

(21) Appl. No.: 17/973,207

(22) Filed: Oct. 25, 2022

(65) Prior Publication Data

US 2023/0143901 A1 May 11, 2023

(30) Foreign Application Priority Data

Nov. 9, 2021 (JP) .................................. 2021-182520

(51) Int. Cl.
*H04N 23/68* (2023.01)
*G01H 17/00* (2006.01)
*G06T 7/00* (2017.01)

(52) U.S. Cl.
CPC .......... *H04N 23/683* (2023.01); *G01H 17/00* (2013.01); *G06T 7/0002* (2013.01); *H04N 23/682* (2023.01)

(58) Field of Classification Search
CPC .... G01H 17/00; G06T 7/0002; H04N 23/682; H04N 23/683
See application file for complete search history.

(56) References Cited

FOREIGN PATENT DOCUMENTS

JP 5041094 B2 10/2012

OTHER PUBLICATIONS

Camera & Imaging Products Association (CIPA), "Verification of Vibratory Apparatus for CIPA DC-X011-2012 Measurement and Description Method for Image Stabilization Performance of Digital Cameras (Optical System)" 2012. (Year: 2012).*
Camera & Imaging Products Association (CIPA), CIPA DC-X011-Translation-2014, "Measurement and Description Method for Image Stabilization Performance of Digital Cameras (Optical System)" 2012-2014. (Year: 2014).*

* cited by examiner

*Primary Examiner* — Paul M. West
(74) *Attorney, Agent, or Firm* — Cowan, Liebowitz & Latman, P.C.

(57) ABSTRACT

An image evaluation apparatus comprises an image capturing device configured to include a blur correction function, a vibration control unit configured to vibrate the image capturing device based on an input waveform, a vibration detection unit that detects the vibration of the image capturing unit, a memory storing instructions, and a processor executing the instructions causing the image evaluation apparatus to compare the input waveform with the waveform of the vibration detection result that was detected by the vibration detection unit, and perform a captured image evaluation that is an evaluation of the blur correction function based on a captured image result of a subject by the image capturing device, wherein the processor performs captured image evaluation in a case in which it has been determined that the difference of the waveform of the vibration detection result with respect to the input waveform is within a predetermined range.

17 Claims, 10 Drawing Sheets

EVALUATION APPARATUS, EVALUATION METHOD, AND STORAGE MEDIUM

BACKGROUND OF THE INVENTION

Field of the Invention

The present invention relates to an evaluation apparatus of an image captured by an image capturing device, in particular, an evaluation apparatus configured to evaluate a captured image by imparting a vibration to an image capturing device, an evaluation method, and a storage medium

Description of the Related Art

In connection with an evaluation apparatus of a blur correction effect or blur correction performance of an image capturing device, Japanese Patent No. 5041094 discloses a method of generating a vibration waveform to be input to a vibration table in an image evaluation apparatus that uses a vibration table to vibrate an image capturing device configured to include a blur correction function.

However, in the conventional technology disclosed in Japanese Patent No. 5041094, due to the size of the lens of the image capturing device, and the fixing method and installation position and the like of the image capturing device, a vibration waveform to be input to the vibration table and the state of the vibration of the image capturing device that is actually vibrated may be different. Therefore, even though a vibration waveform that is input to the vibration table is different from the waveform of the vibration of the image capturing device that is actually vibrated, there is a risk of evaluating the blur correction performance of the image capturing device without determining that the waveform of the vibration waveform is different.

SUMMARY OF THE INVENTION

The present invention was made in view of the above-described situation, and provides an evaluation apparatus that is capable of evaluating blur correction performance of an image capturing device based on a determination as to whether or not the input vibration waveform and a vibration waveform of the image capturing device that is actually vibrated are different.

An image evaluation apparatus according to one embodiment of the present invention is configured to include an image capturing device configured to include a blur correction function, a vibration control unit configured to vibrate the image capturing device based on an input waveform, a vibration detection unit configured to detect the vibration of the image capturing device, a comparison unit configured to compare the input waveform with the waveform of the vibration detection result that was detected by the vibration detection unit, and a captured image evaluation unit configured to perform captured image evaluation that is an evaluation of the blur correction function based on a captured image result of a subject by the image capturing device, wherein the captured image evaluation unit performs the captured image evaluation in a case in which it has been determined by the comparison unit that the vibration detection result with respect to the input waveform is within a predetermined range.

Further features of the present invention will become apparent from the following description of exemplary embodiments (with reference to the attached drawings).

DESCRIPTION OF THE EMBODIMENTS

Hereinafter, exemplary embodiments for implementing the present invention will be explained with reference to the drawings and the like. However, the following embodiments do not limit the invention according to the claims, and not all of the features explained in the following embodiments are essential to the present invention.

Figure 1:
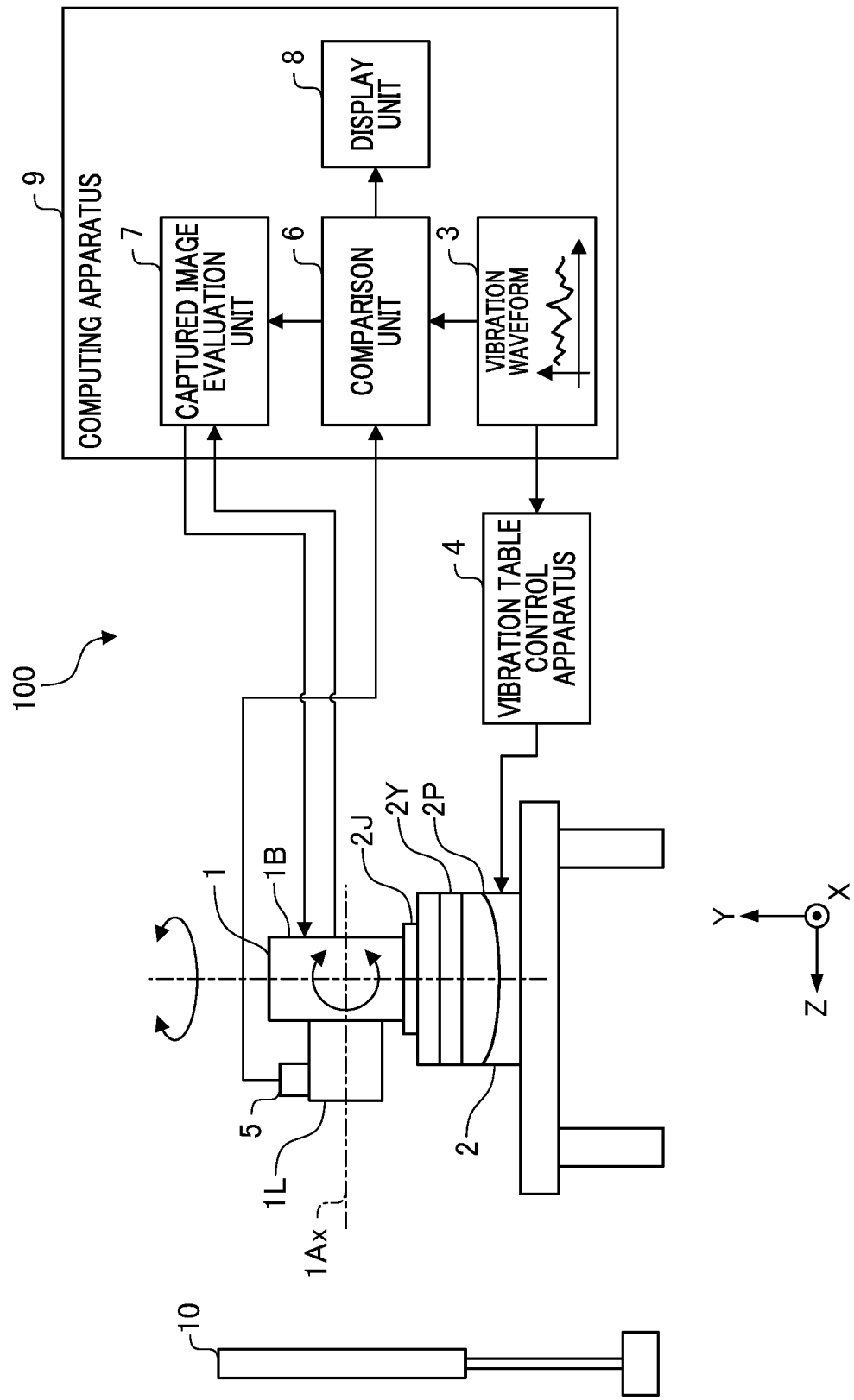
FIG. 1 is a schematic diagram of an image evaluation apparatus in a first embodiment.

FIG. 1 is a schematic diagram of an image evaluation apparatus 100 in a first embodiment. For convenience of explanation, as shown in the image evaluation apparatus 100 of FIG. 1, an X-axis, a Y-axis, and a Z-axis that are orthogonal to each other with respect to the image capturing device 1 are defined. The Z-axis is an axis that is parallel to an optical axis 1Ax of an image capturing lens 1L, and is substantially orthogonal to a light-receiving surface (image capturing surface) of an image capturing element (not shown) that is installed in the image capturing device 1. When the Z-axis is parallel to the horizontal direction, the X-axis is an axis that is orthogonal to the Z-axis in the horizontal plane. When the Z-axis is parallel to the horizontal direction, the Y-axis is an axis that is parallel to the vertical direction.

First Embodiment

Hereinafter, a first embodiment of the present invention will be explained. FIG. 1 is a schematic diagram of the image evaluation apparatus 100 in the first embodiment. The image capturing device 1 is an image capturing apparatus such as a camera, and a blur correction function (not shown) is provided inside the image capturing device 1. The blur correction function (image stabilization function) is a function of detecting a shake of an image capturing apparatus by using, for example, an angular velocity sensor or the like, and of driving a blur correction unit such as a correction lens based on the detected shake, thereby causing no blur in the captured image. The image capturing device 1 is held by a vibration table 2 configured to vibrate the image capturing device 1 via a connecting member 2J.

The vibration table 2 includes a pitching stage 2P configured to rotationally vibrate the image capturing device 1 around an X-axis, a yawing stage 2Y configured to rotationally vibrate the image capturing device 1 around a Y-axis, and a connecting member 2J configured to connect the yawing stage 2Y and the image capturing device 1. Although not shown in FIG. 1, there may be provided a roll stage that rotationally vibrates about the optical axis 1A$x$ (around the Z-axis), and there may be provided a translational stage that translationally vibrates each of the X-axis, Y-axis, and Z-axis.

A vibration waveform 3 is data of a waveform that defines a drive amount over time in a state that the vibration table 2 vibrates the image capturing device 1. The vibration waveform 3 is input to a vibration table control apparatus 4. In the present embodiment, the vibration waveform 3 is an example of an input waveform, and the vibration table control apparatus 4 is an example of a vibration table control unit. Accordingly, the vibration table control apparatus 4 vibrates the vibration table 2 based on the vibration waveform 3. In the present embodiment, the vibration table 2 and the vibration table control apparatus 4 are an example of a configuration included in a vibration control unit that vibrates the image capturing device 1 based on an input waveform.

A vibration detection unit 5 detects a vibration of the image capturing device 1 that was vibrated by the vibration table 2. The vibration detection unit 5 is configured to include a detection axis that is capable of detecting each of a vibration corresponding to the vibration axis of the vibration table 2. The vibration detection unit 5 is held in the image capturing device 1. The specific holding method may be, for example, holding by an adhesive member such as double-sided tape (not shown), or by a connecting member such as a screw. The vibration detection unit 5 may be a detection unit configured to detect a vibration of the image capturing device 1 in a non-contact manner by using a laser displacement meter or the like. In addition, although in the present embodiment, the vibration detection unit 5 is made a vibration detection member that is disposed outside of the image capturing device 1, it is not limited thereto, and may be a vibration detection member that is disposed inside of the image capturing device 1. Further, the vibration detection unit 5 may be configured to detect a vibration based on a motion vector that is obtained from a captured image of the image capturing device 1.

It is preferable that the vibration detection position of the image capturing unit 1 by the vibration detection unit 5 be made distal to the position at which the image capturing device 1 is held by the vibration table 2. Thereby, the vibration detection unit 5 detects the vibration of the image capturing device 1 more satisfactorily. For example, as shown in FIG. 1, it is preferable that the detection is made at the distal end portion of the image capturing lens 1L.

A comparison unit 6 compares the vibration waveform 3 with the vibration detection results detected by the vibration detection unit 5. The comparison unit 6 determines whether the vibration detection result with respect to the vibration waveform 3 is within a predetermined range. The comparison unit 6 transmits the determination result to a captured image evaluation unit 7 or a display unit 8. In the present embodiment, the comparison unit 6 is an example of a comparison unit that compares an input waveform with the waveform of the vibration detection result detected by the vibration detection unit 5.

In a case in which the vibration detection result is within a predetermined range, the captured image evaluation unit 7 issues a command to capture an image of a subject 10 to the image capturing device 1. The captured image evaluation unit 7 receives the captured image from the image capturing device 1, and evaluates this captured image. In the present embodiment, the captured image evaluation unit 7 is an example of an image evaluation unit that performs evaluation of a captured image that is an evaluation of a blur correction function based on a captured image result of a subject by the image capturing device 1.

The display unit 8 is configured to display a vibration detection result. For example, in a case in which the vibration detection result is outside of a predetermined range, it is displayed that the vibration detection result is outside of the predetermined range. Note that the display content of the display unit 8 is not limited thereto.

A computing apparatus 9 is configured to store the vibration waveform 3. Further, the computing apparatus 9 includes the comparison unit 6, the captured image evaluation unit 7, and the display unit 8, and controls the entire image evaluation apparatus 100 that includes the vibration table control apparatus 4. The subject 10 is preferably a chart that is suitable when evaluating a captured image. Note that the computing apparatus 9 includes, as hardware, at least a CPU that performs calculations related to control in each unit, a ROM in which a program is recorded, and a RAM that is used as a temporary area such as a main memory of the CPU, work area, or the like. Note that CPU is an abbreviation for "Central Processing Unit", ROM is an abbreviation for "Read Only Memory", and RAM is an abbreviation for "Random Access Memory".

Figure 2:
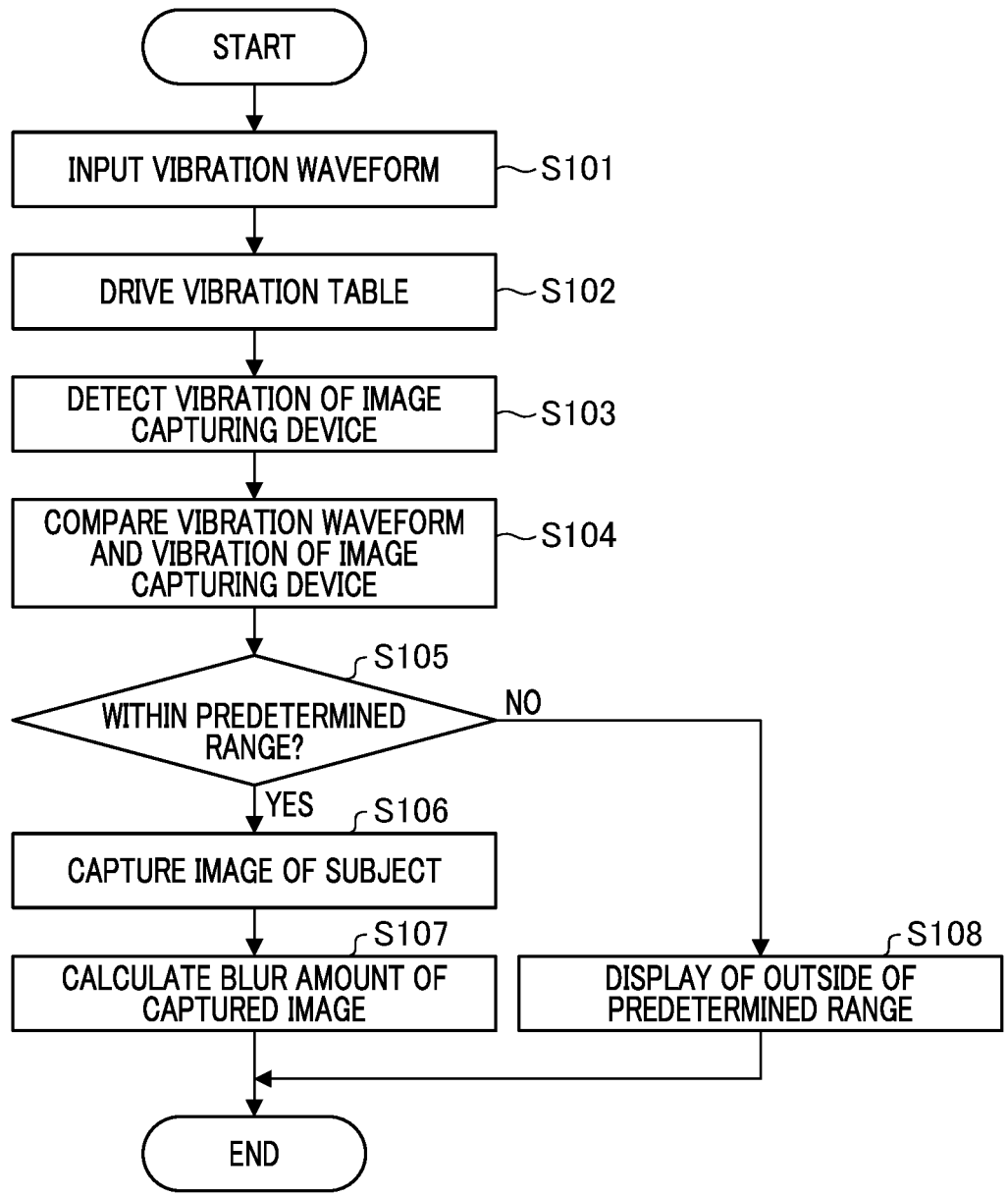
FIG. 2 is a flowchart showing processing from the vibration of a vibration table to a captured image evaluation in the first embodiment.

FIG. 2 is a flowchart showing processing from the vibration of a vibration table 2 to a captured image evaluation in the first embodiment. The processing shown in the following flowchart is performed by the CPU that is included in the computing apparatus 9.

In step S101, the vibration waveform 3 that is stored in the computing apparatus 9 is input to the vibration table control apparatus 4.

In step 102, the vibration table 2 is driven based on the vibration waveform 3. Thereby, the image capturing device 1 to be measured that is held by the vibration table 2 is vibrated.

In step S103, the vibration of the image capturing device 1 that is vibrated in step S102 is detected by the vibration detection unit 5.

In step S104, the vibration detection result detected by the vibration detection unit 5 is sent to the comparison unit 6, and the vibration waveform 3 and the vibration detection result are compared.

In step S105, it has been determined by the comparison unit 6 as to whether the vibration detection result is within a predetermined range with respect to the vibration waveform 3. In this context, the predetermined range of the vibration detection result may be defined, for example, by comparing each frequency component of the vibration detection result with respect to each frequency component included in the vibration waveform 3, or by comparing the vibration waveform 3 and the vibration detection result in a time series. In step S105, if it has been determined that the vibration detection result is within the predetermined range, the processing proceeds to step S106. In step S105, in a case in which it has been determined that the vibration detection result is not within the predetermined range, the processing proceeds to step S108.

In step S106, upon receiving the result of the determination that the vibration detection result is within a predetermined range, the captured image evaluation unit 7 issues a command to capture an image of the subject 10 a plurality of times to the image capturing device 1. In a state in which the vibration table 2 is being vibrated, the image capturing device 1 captures the image of the subject 10. Thereby, a captured image is generated.

In step S107, the captured image evaluation unit 7 performs a captured image evaluation of the captured image. A captured image evaluation is an evaluation of the blur correction function based on the captured image. The captured image evaluation measures, for example, a blur width of a predetermined portion (for example, an edge portion) in an image in each captured image in images for which the blur has been corrected by the blur correction function of the image capturing device 1. The captured image evaluation unit 7 calculates the blur amount based on the blurring width. Thereafter, the processing is terminated. Thereby, in step S107, in a case in which the comparison unit 6 has determined that the vibration detection result is within a predetermined range in step S105, the captured image evaluation unit 7 performs a captured image evaluation.

In step S108, the display unit 8 displays that the vibration detection result of the image capturing device 1 is outside of a predetermined range. For example, the display unit 8 may be a display lamp, a display device, or the like (not shown) that is provided in the computing apparatus 9.

After step S108, the processing is terminated. Note that, in a case in which the comparison unit 6 determines that the vibration detection result is outside of a predetermined range, after changing the holding method of image capturing device 1, it may be determined again as to whether the vibration detection result is within the predetermined range. By changing the holding method of the image capturing device 1, it becomes possible to change the control state related to the vibration table control apparatus 4.

Figure 3:
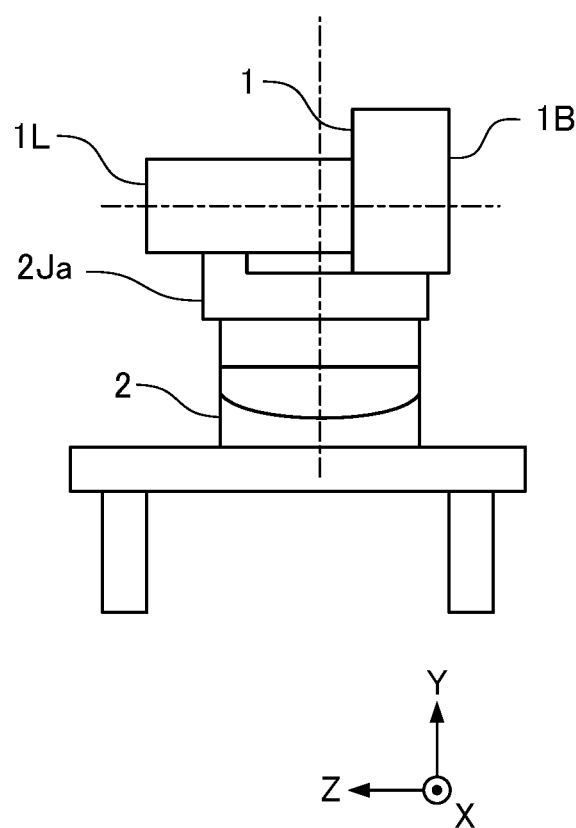
FIG. 3 is a diagram showing a holding method of an image capturing device that uses a connecting member that is different from the holding method in FIG. 1.

In this context, as a specific holding method to be changed, for example, there is a holding method of the image capturing device 1 by a connecting member 2Ja shown in FIG. 3. FIG. 3 is a diagram showing a holding method of the image capturing device 1 by using the connecting member 2Ja that is different from the holding method in FIG. 1. The connecting member 2J of FIG. 1 holds the image capturing device 1 at one location on an image capturing device main body unit 1B, and connects the image capturing device 1 and the vibration table 2. However, as in the connecting member 2Ja that is shown in FIG. 3, in particular, in a case in which the image capturing lens 1L is long, the image capturing device main body unit 1B and the image capturing lens 1L may be connected to each other at two locations by using the connecting member 2J, and the vibration table 2 may be configured to hold the image capturing device 1 at two locations. Note that, because the connecting member 2J is an integral member, the connecting member 2J that holds the image capturing device 1 at two locations is the same member.

In addition, by using the connecting member 2Ja, the position at which the image capturing device 1 is held with respect to the vibration table 2 may be changed. That is, the connecting member 2Ja is provided with a plurality of connecting portions (for example, hole portions for screw connections) (not shown) for connecting to the vibration table 2. Therefore, by changing the position of a connecting portion for connecting to the vibration table 2, it becomes possible to change the holding position. Thereby, the connecting member 2Ja enables the image capturing device 1 to be held stably at a plurality of locations. In addition, by changing the connecting position again, it becomes possible to change the position of the image capturing device 1 to the center of gravity permitted by the vibration table 2.

According to the present embodiment, based on the result of the comparison of the vibration waveform 3 and the vibration detection result of the image capturing device 1, it has been determined as to whether the captured image evaluation (evaluation of blur correction performance of image capturing device 1) is possible or not. Thereby, it is possible to provide an image evaluation apparatus 100 that is capable of evaluating the blur correction performance of the image capturing device 1 based on a determination as to whether or not the input vibration waveform 3 and the vibration waveform of the image capturing device 1 that is actually vibrated are different.

Second Embodiment

Figure 4:
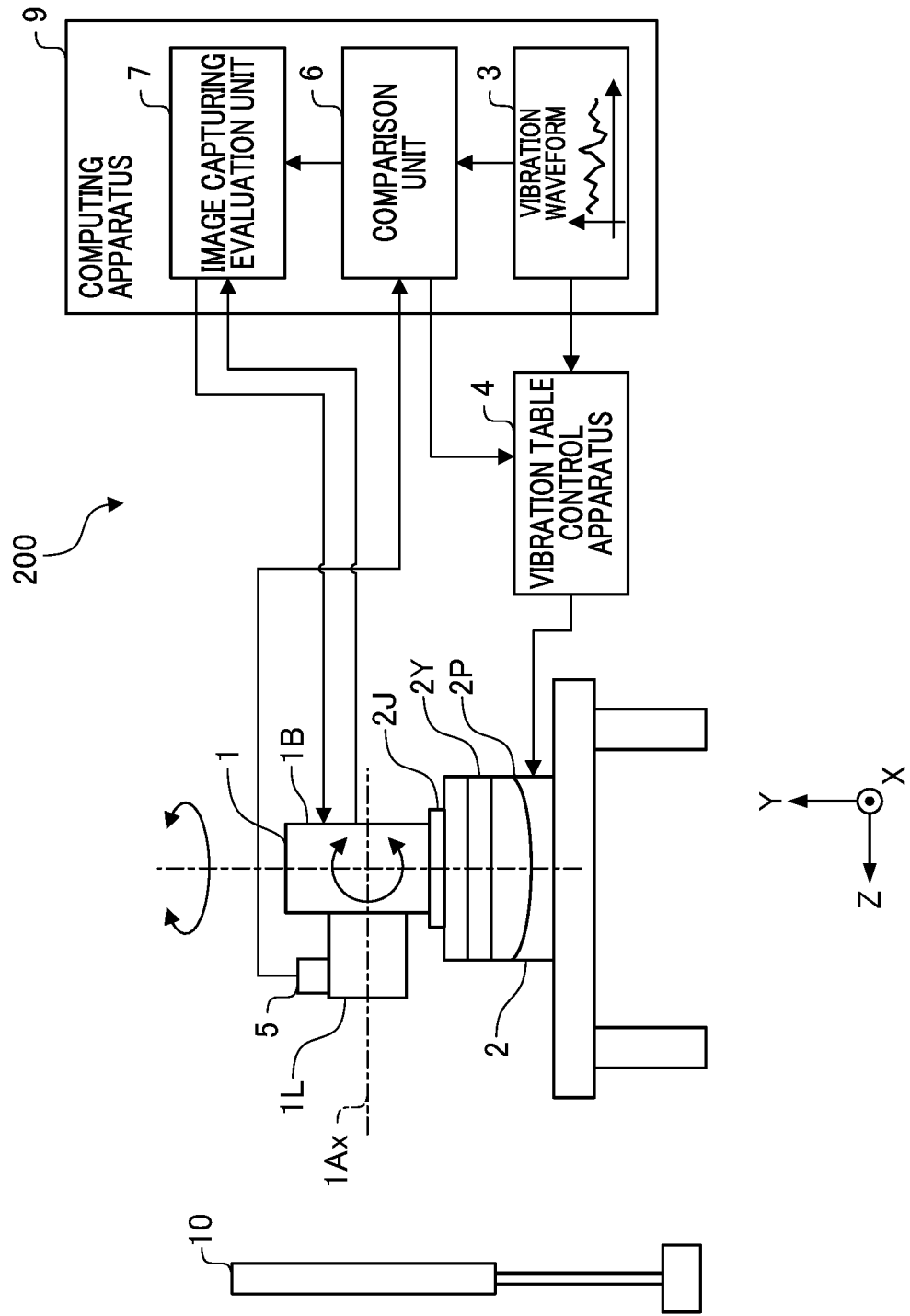
FIG. 4 is a schematic diagram of an image evaluation apparatus in a second embodiment.

Hereinafter, a second embodiment of the present invention will be explained. FIG. 4 is a schematic diagram of an image evaluation apparatus 200 in a second embodiment. Referring to FIG. 4, a schematic configuration of the image evaluation apparatus 200 according to a second embodiment of the present invention will be explained. Note that configurations similar to those in the above-described embodiments will be described by adding the same reference numerals to the drawings and omitting the explanation thereof. As shown in FIG. 4, the image evaluation apparatus 200 in the second embodiment has a similar configuration as that of the image evaluation apparatus 100, except that, compared to the image evaluation apparatus 100 of the first embodiment, a display unit 8 is not provided.

Figure 5:
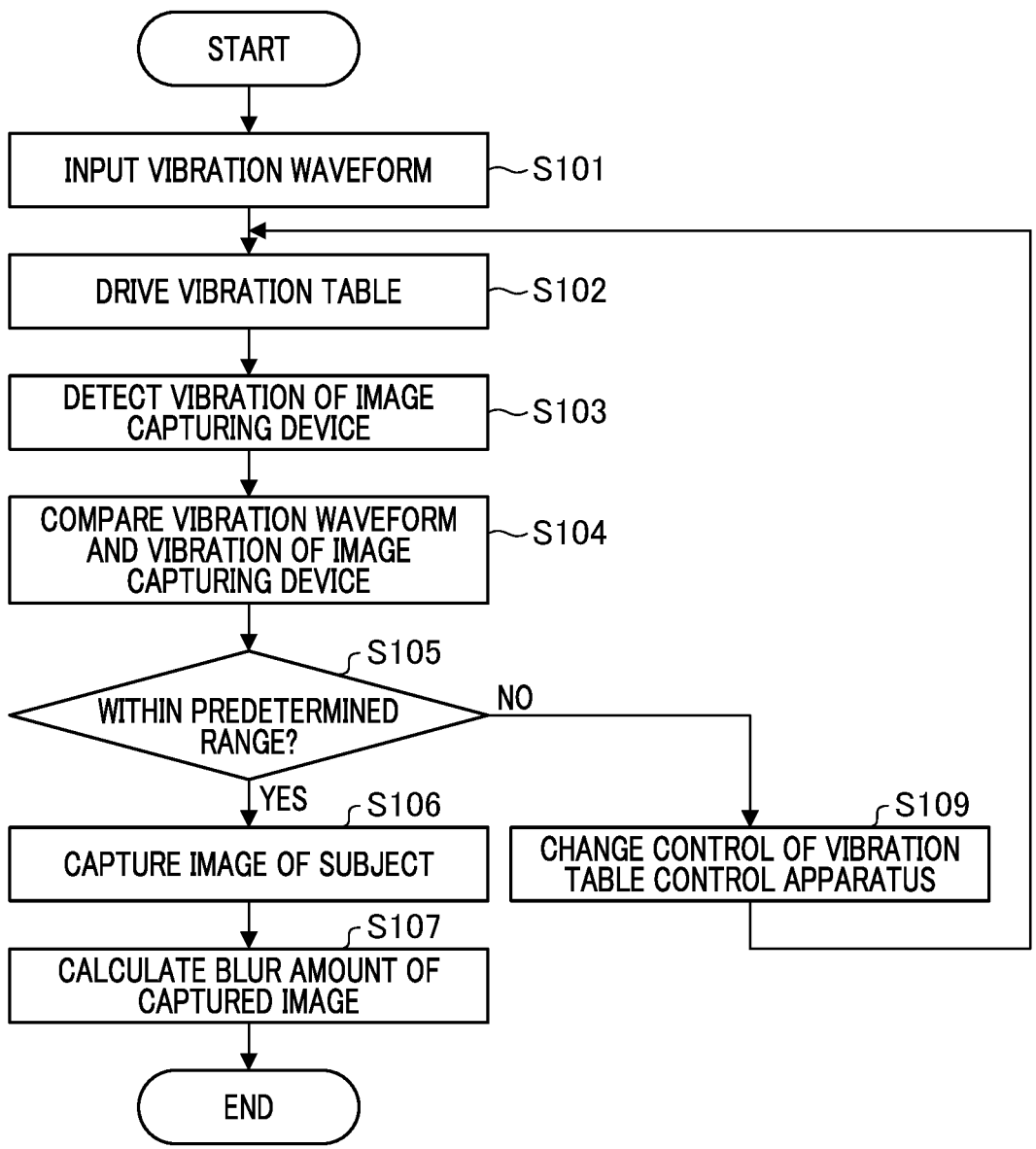
FIG. 5 is a flowchart showing processing from the vibration of a vibration table to a captured image evaluation in the second embodiment.

FIG. 5 is a flowchart showing processing from the vibration of a vibration table 2 to a captured image evaluation in the second embodiment. This processing is performed by the CPU that is included in the computing apparatus 9.

Similar to the first embodiment described above, in steps S101 to S103, the vibration table 2 is driven based on the vibration waveform 3 to vibrate the image capturing device 1. The vibration of the image capturing device 1 is detected by the vibration detection unit 5. In addition, in step S104, the comparison unit 6 compares the vibration waveform 3 with the vibration detection result detected by the vibration detection unit 5.

In step S105, the comparison unit 6 determines whether the vibration detection result with respect to the vibration waveform 3 is within a predetermined range. In the present embodiment, the determination result is sent to the vibration table control apparatus 4 or the captured image evaluation apparatus 7. This will be explained in detail next.

In step S105, in a case in which it have been determined that the vibration detection result is within the predetermined range, the processing proceeds to step S106, in which an image is captured of the subject 10, and in step S107, the blur amount in the captured image is calculated, and the processing is terminated. In contrast, in the second embodiment, in a case in which it has been determined that the vibration detection result is outside of the predetermined range, the processing proceeds to step S109.

In step S109, the vibration table control apparatus 4 changes the control of the vibration table 2. At this time, the vibration table control apparatus 4 is changed so as to perform feedback control by using the vibration detection result of the vibration detection unit 5, and the processing returns to step S102. Thereby, in the present embodiment, the control state relating to the vibration of the vibration table control apparatus 4 is configured to be changeable. Specifically, changing the control of the vibration applied to the vibration table 2 of the vibration table control apparatus 4 is possible. In changing the control of the vibration table control apparatus 4, control of the vibration applied to the vibration table 2 is performed so that the vibration detection result with respect to the vibration waveform 3 becomes within a predetermined range. As a result, the image capturing device 1 becomes in a vibration state equivalent to the vibration waveform 3. Thereby, according to the present embodiment, even if the vibration detection result with respect to the vibration waveform 3 is outside of the predetermined range, by changing the control of the vibration table control apparatus 4, the image capturing device 1 becomes in a state in which vibration state is equivalent to the vibration waveform 3 and the captured image evaluation becomes possible.

As described above, in the present embodiment, the captured image evaluation is performed based on the result of comparing the vibration waveform 3 of the vibration table 2 and the vibration of the image capturing device 1. Thereby, it is possible to provide an image evaluation apparatus 200 that is capable of evaluating the blur correction performance of the image capturing device 1 based on a determination as to whether or not the input vibration waveform 3 and the vibration waveform of the image capturing device 1 that is actually vibrated are different.

Third Embodiment

Figure 6:
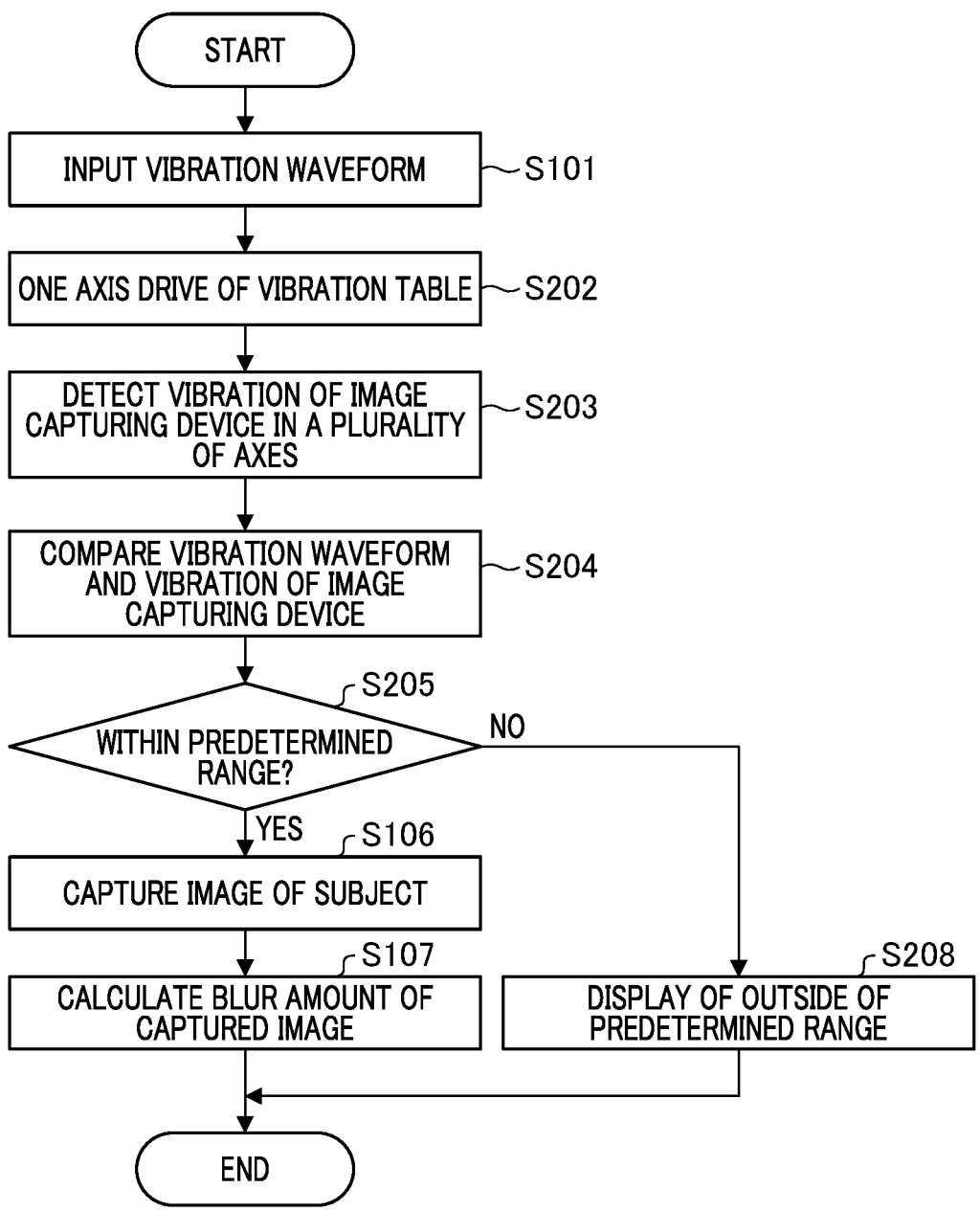
FIG. 6 is a flowchart showing processing from the vibration of a vibration table to a captured image evaluation in a third embodiment.

Hereinafter, a third embodiment of the present invention will be explained. The overall configuration of the image evaluation apparatus 100 of a third embodiment is similar to the image evaluation apparatus 100 of the first embodiment shown in FIG. 1. FIG. 6 is a flowchart showing processing from the vibration of a vibration table 2 to a captured image evaluation in the third embodiment. Note that similar configurations as those in the above-described embodiments will be explained by adding the same reference numerals to the drawings and omitting the explanation thereof.

In step S202, the vibration table control apparatus 4, to which the vibration waveform 3 was input in step S101, vibrates only one vibration axis. For example, only the pitching stage 2P of the vibration table 2 is vibrated, while other stages such as the yawing stage 2Y remain stopped.

In step S203, the vibration detection unit 5 detects vibration around an axis of plurality of detection axes that include the pitching stage 2P that rotationally vibrates around the X-axis.

In step S204, the vibration waveform 3 of the pitching stage 2P and the plurality of detection axes are compared with a plurality of vibration detection results detected by the vibration detection unit 5.

In step S205, the comparison unit 6 compares the vibration detection result of around the vibration axis and the vibration detection result of around the axis that is not being vibrated with each of the vibration waveforms 3. As a result, in a case in which it was determined that the vibration detection result around the vibration axis is within a predetermined range and the vibration detection result around the axis that is not being vibrated is sufficiently small, the processing proceeds to step S106, and the processing is terminated after step S107. In contrast, in a case in which a vibration above a predetermined level that cannot be said to be sufficiently small is detected in the result of vibration detection around the axis that is not being vibrated, the processing proceeds to step S208.

In step S208, a state in which vibration around an axis that is not being vibrated is detected. Therefore, the display unit 8 displays that crosstalk is occurring in the vibration state of the image capturing device 1. Here, "crosstalk" means that in a case in which a load is applied to only one axis, the output of the other axes is affected. In the present embodiment, in a case in which a vibration is output in one detection axis direction that is different from that in which the vibration is applied, it can be said that crosstalk is occurring. The processing is terminated after step S208.

Note that, in the present embodiment, in step S208, in a case in which it was displayed that crosstalk is occurring, the processing was terminated as is, but this is not limited thereto. For example, after step S208, after changing the method of holding the image capturing device 1, it is possible to determine again as to whether the result of vibration detection around the axis of vibration is within a predetermined range and whether the result of vibration detection around the axis that is not being vibrated is sufficiently small.

Figure 7:
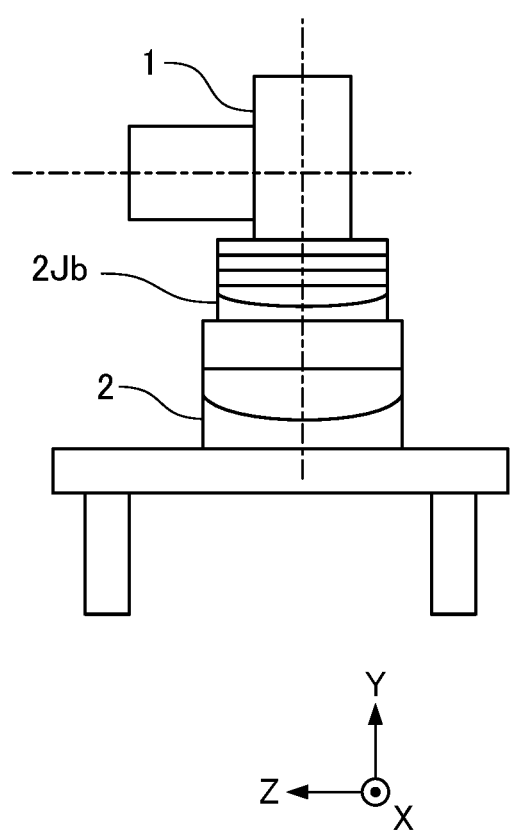
FIG. 7 is a diagram showing a holding method of an image capturing device that uses a connecting member that is different from that of the holding method in FIG. 1.

Here, a specific holding method that is changed is, for example, the method of holding the image capturing device 1 by a connecting member 2Jb shown in FIG. 7. FIG. 7 is a diagram showing a holding method of the image capturing device 1 by using the connecting member 2Jb that is different from the holding method in FIG. 1. The connecting member 2Jb shown in FIG. 7 is a stage having a slide mechanism (not shown) that is rotatable around the X-axis, the Y-axis, and the Z-axis, respectively. Therefore, the angle of the image capturing device 1 with respect to the vibration table 2 can be changed by the connecting member 2Jb.

According to the present embodiment, based on the result of the comparison between the vibration waveform 3 and the vibration detection result of the image capturing device 1, it has determined as to whether a captured image evaluation is possible or not. Thereby, it is possible to provide an image evaluation apparatus 100 that is capable of evaluating the blur correction performance of the image capturing device 1 based on a determination as to whether or not the input vibration waveform 3 and the vibration waveform of the image capturing device 1 that is actually vibrated are different.

Fourth Embodiment

Figure 8:
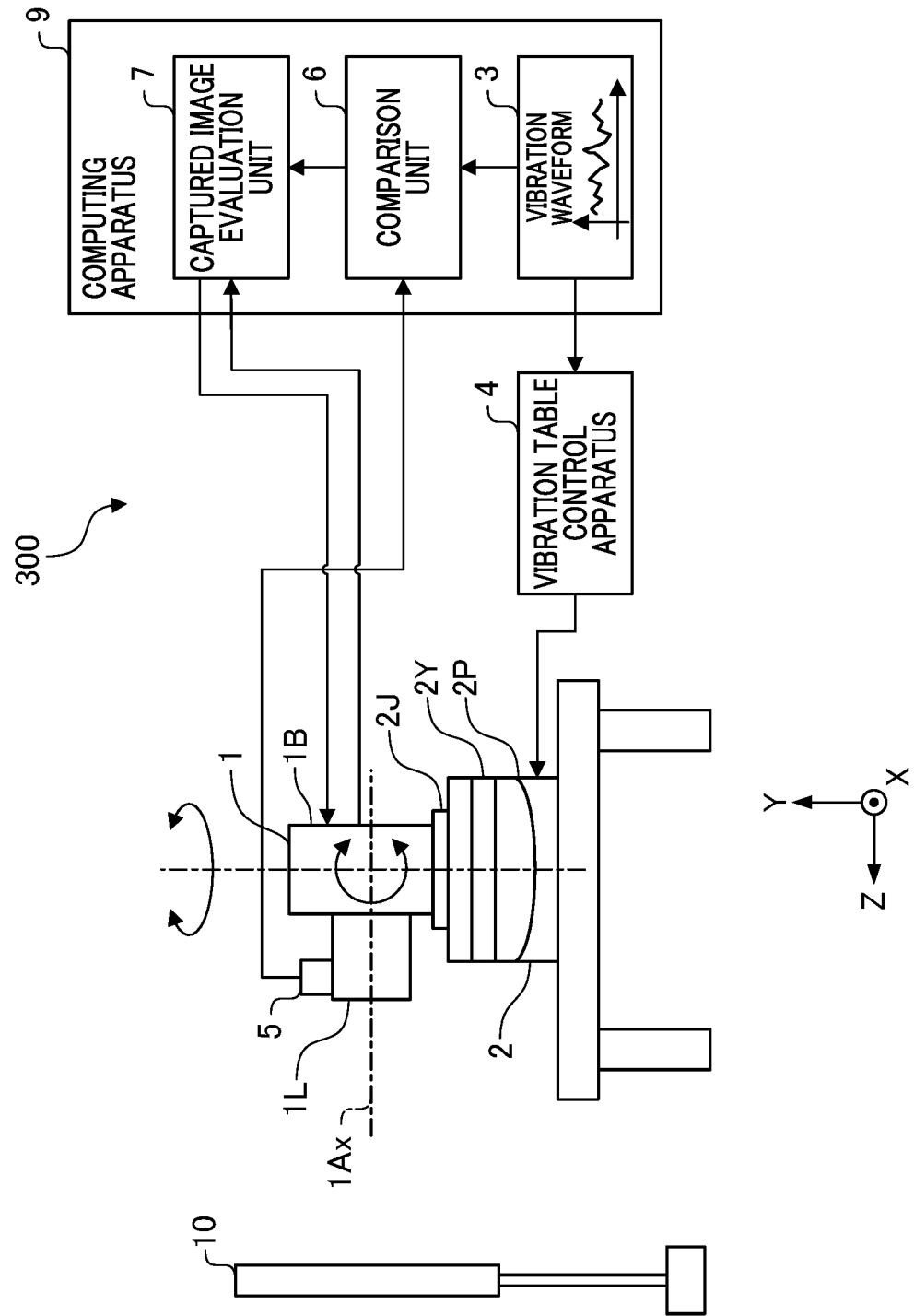
FIG. 8 is a schematic diagram of an image evaluation apparatus in a fourth embodiment.

Hereinafter, a fourth embodiment of the present invention will be explained. FIG. 8 is a schematic diagram of an image evaluation apparatus 300 in the fourth embodiment. Referring to FIG. 8, a schematic configuration of the image evaluation apparatus 300 according to the fourth embodiment of the present invention will be explained. In the present embodiment, in a case in which the captured image evaluation unit 7 determines that a vibration detection result is outside of a predetermined range, an evaluation of the blur correction function is performed by a different evaluation method than the image capture evaluation performed in step S107. Note that similar configurations as those in the above-described embodiment will be described by adding the same reference numerals and omitting the description thereof. As shown in FIG. 8, the image evaluation apparatus 300 in the fourth embodiment has a configuration similar to that of the image evaluation apparatus 100, except that, compared to the image evaluation apparatus 100 of the first embodiment, a display unit 8 is not provided.

Figure 9:
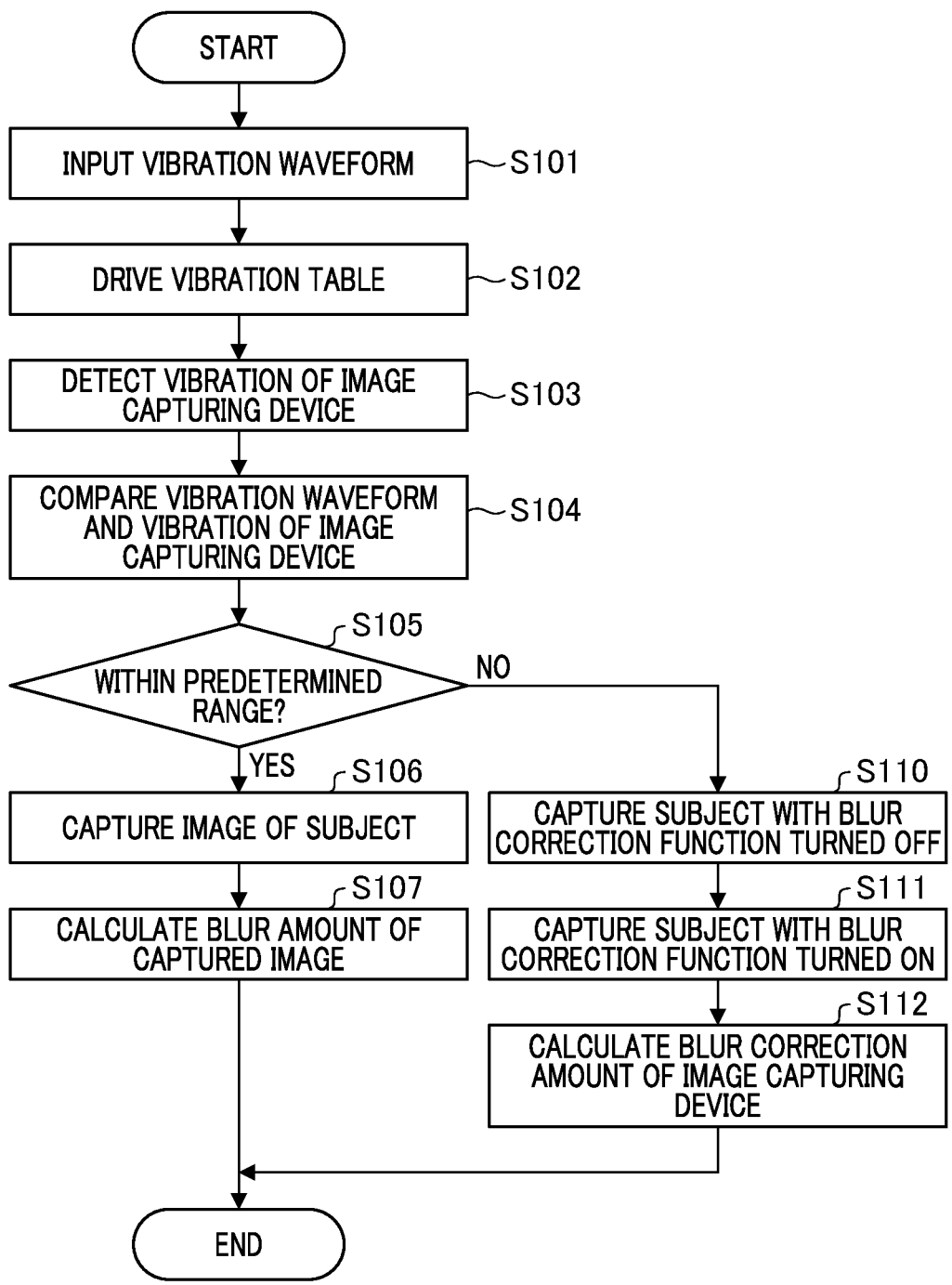
FIG. 9 is a flowchart showing processing from the vibration of a vibration table to a captured image evaluation in the fourth embodiment.

FIG. 9 is a flowchart showing processing from the vibration of a vibration table 2 to a captured image evaluation in the fourth embodiment. This processing is performed by the CPU that is included in the computing apparatus 9.

Similar to the first embodiment described above, in steps S101 to S103, the vibration table 2 is driven based on the vibration waveform 3 so as to vibrate the image capturing device 1. Vibration of the image capturing device 1 is detected by the vibration detection unit 5. In addition, in step S104, the comparison unit 6 compares the vibration waveform 3 with the vibration detection result that was detected by the vibration detection unit 5. In step S105, the comparison unit 6 determines whether the vibration detection result with respect to the vibration waveform 3 is within a predetermined range. The determination result is transmitted to the captured image evaluation unit 7. In step S105, in a case in which the vibration detection result is in a predetermined range, the processing proceeds to step S106 and an image of the subject 10 is captured. Subsequently, the processing proceeds to step S107, and the blur amount in the captured image is calculated. In contrast, in step S105, in a case in which the vibration detection result is outside the predetermined range, the processing proceeds to step S110.

In step S110, an image of the subject 10 is captured in a state in which the vibration detection result is outside the predetermined range. Here, in step S110, an image is captured in a state in which the blur correction function of the image capturing device 1 is turned off. Next, in step S111, an image is captured in a state in which the blur correction function of the image capturing device 1 is turned on.

In step S112, the blur amount is calculated from each of the captured images that were captured in step S110 and step S111. In addition, the blur correction amount of the blur correction function of the image capturing device 1 is calculated by taking the difference between the blur amount in a state in which the blur correction function is turned off and the blur amount in a state in which the blur correction function is turned on.

In the present embodiment, in a case in which the vibration detection result is outside the range, the captured image evaluation method is changed by the captured image evaluation unit 7, and the blur correction amount of the blur correction function of the image capturing device 1 is calculated. Thereby, it is possible to provide an image evaluation apparatus 300 that is capable of evaluating the blur correction performance of the image capturing device 1 based on a determination as to whether or not the input vibration waveform 3 and the vibration waveform of the image capturing device 1 that is actually vibrated are different.

Fifth Embodiment

Figure 10:
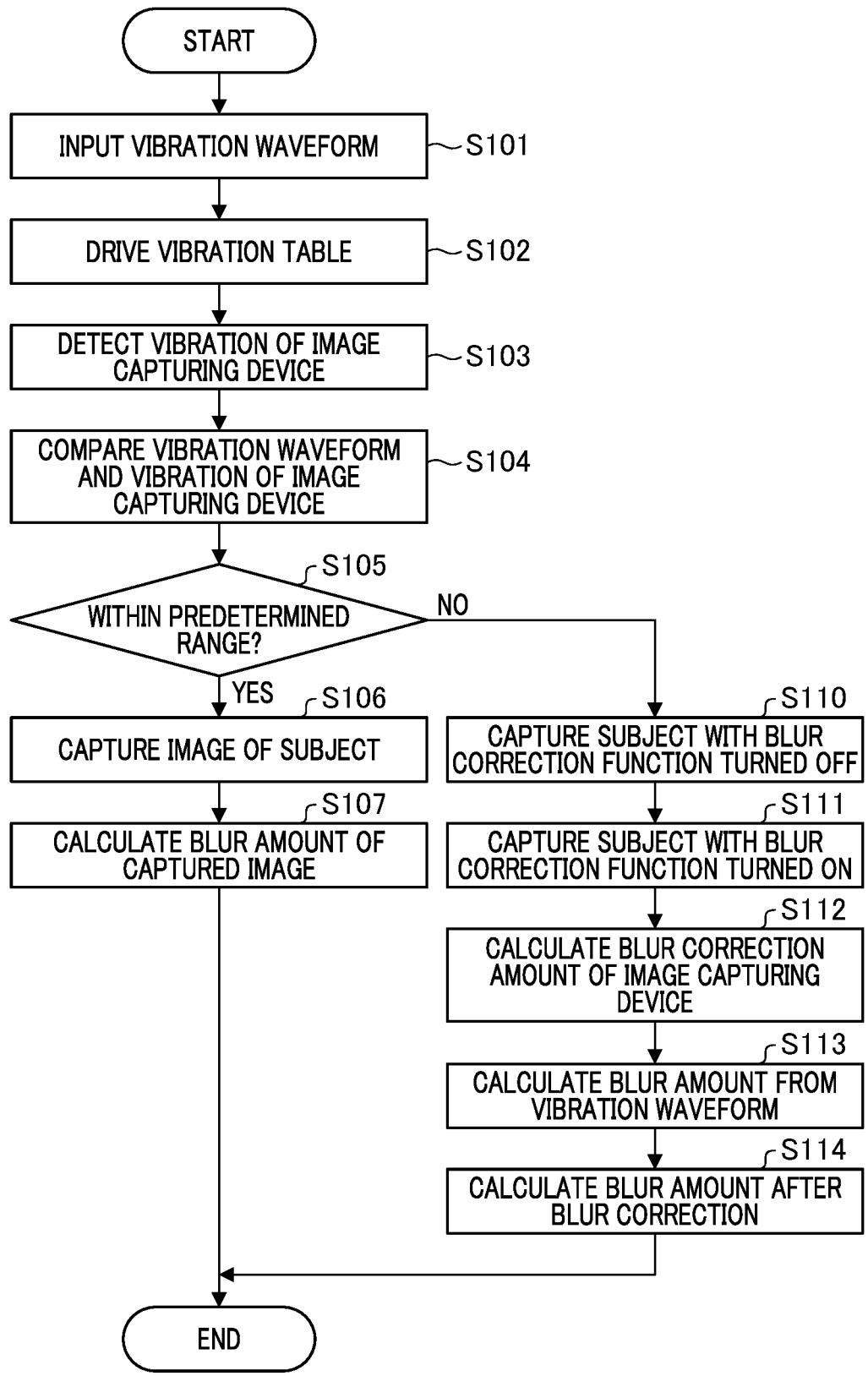
FIG. 10 is a flowchart showing processing from the vibration of a vibration table to a captured image evaluation in a fifth embodiment.

Hereinafter, a fifth embodiment of the present invention will be explained. The overall configuration of the image evaluation apparatus 300 of the fifth embodiment is similar to the image evaluation apparatus 300 of the third embodiment shown in FIG. 8. FIG. 10 is a flowchart showing processing from the vibration of a vibration table 2 to a captured image evaluation in the fifth embodiment. Note that similar configurations as those in the above-described embodiment will be explained by adding the same reference numerals and omitting the description thereof.

Steps S101 to S107 are similar to the steps in the fourth embodiment. In addition, in step S105, in a case in which the vibration detection result is outside of a predetermined range, the processing proceeds to step S110. Thereafter, in accordance with steps S111 and S112, the blur correction amount of the blur correction function is calculated by taking the difference between the blur amount when the blur correction function is turned off and the blur amount when the blur correction function is turned on. After step S112, the processing proceeds to step S113.

In step S113, the assumed blur amount is calculated from the vibration waveform 3. For example, it is calculated by using the focal length information of the image capturing device 1 from Equation (1).

$$\text{Blur amount} = \text{focal length} \times \tan \alpha \quad (1)$$

α: blur angle by vibration waveform

In step S114, the difference between the blur amount obtained in Equation (1) and the blur correction amount obtained in step S112 is the blur amount after blur correction that is assumed in a case in which the image capturing device 1 is vibrated and an image is captured based on the vibration waveform 3.

According to the present embodiment, even in a case in which the vibration detection result with respect to the vibration waveform 3 is outside of a predetermined range, by changing the captured image evaluation method, and calculating and evaluating the blur amount after blur correction, which is assumed in a case in which the image capturing device 1 is vibrated and an image is captured based on the vibration waveform 3, the captured image evaluation becomes possible.

As described above, it is possible to provide an image evaluation apparatus 300 that is capable of a captured image evaluation based on the result of a comparison of the vibration waveform 3 of the vibration table 2 and the vibration of the image capturing device 1. Thereby, it is possible to provide an image evaluation apparatus 300 that is capable of evaluating the blur correction performance of the image capturing device 1 based on a determination as to whether or not the input vibration waveform 3 and the vibration waveform of the image capturing device 1 that is actually being vibrated are different.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-182520, filed Nov. 9, 2021, which is hereby incorporated by reference wherein in its entirety.

What is claimed is:

1. An image evaluation apparatus comprising:
an image capturing device configured to include a blur correction function,
a vibration control unit configured to vibrate the image capturing device based on an input waveform,
a vibration detection unit configured to detect the vibration of the image capturing device,
a memory storing instructions; and
a processor executing the instructions causing the image evaluation apparatus to:
compare the input waveform with the waveform of the vibration detection result that was detected by the vibration detection unit, and
perform a captured image evaluation that is an evaluation of the blur correction function based on a captured image result of a subject by the image capturing device,
wherein the processor performs the captured image evaluation in a case in which it has been determined that the vibration detection result with respect to the input waveform is within a predetermined range; and
wherein, in a case in which it has been determined that the vibration detection result is outside of the predetermined range, the processor is configured to perform evaluation of the blur correction function by an evaluation method that is different from the captured image evaluation.

2. The image evaluation apparatus according to claim 1, further configured to include a display unit which, in a case in which it has been determined that the vibration detection result is outside of the predetermined range, is configured to display that the vibration detection result is outside of the predetermined range.

3. The image evaluation apparatus according to claim 1, wherein in a case in which it has been determined that the vibration detection result is outside of the predetermined range, the vibration control unit is configured to be capable of changing a control state with respect to a vibration.

4. The image evaluation apparatus according to claim 3, wherein the vibration control unit is configured to include:
a vibration table that is configured to hold the image capturing device and vibrated based on the input waveform, and
a vibration table control unit that is configured to control a vibration applied to the vibration table.

5. The image evaluation apparatus according to claim 4, wherein the vibration table is configured so as to be capable of holding the image capturing device in at least two locations.

6. The image evaluation apparatus according to claim 5, wherein the image capturing device is configured to include an image capturing lens and an image capturing device main body unit, and wherein the vibration table is configured to hold at least the image capturing lens and the image capturing device main body unit by the same member.

7. The image evaluation apparatus according to claim 4, wherein the vibration table is configured so as to be capable of changing a position at which the image capturing device is held in the vibration table.

8. The image evaluation apparatus according to claim 4, wherein the vibration table control apparatus is configured to perform feedback control so that the vibration detection result becomes within the predetermined range.

9. The image evaluation apparatus according to claim 1, further configured to include a display unit configured to display a detection result of a vibration,
wherein the vibration detection unit is capable of detecting a vibration of a plurality of detection axis directions,
wherein, in a case in which the vibration detection unit has detected that a vibration of a second detection axis direction that is different from a first detection axis direction is greater than or equal to a predetermined magnitude with respect to a vibration in the first detection axis direction among the plurality of detection axis directions, the processor determines that a vibration determination result is outside of a predetermined range, and
wherein the display unit displays that a vibration detection result is outside of the predetermined range.

10. The image evaluation apparatus according to claim 9, wherein the vibration control unit is configured to include:
a vibration table that is configured to hold the image capturing device and be vibrated based on the input waveform, and
a vibration table control unit configured to control a vibration applied to the vibration table wherein the vibration table is capable of changing the angle at which the image capturing device is held in the vibration table.

11. The image evaluation apparatus according to claim 1, wherein an evaluation method that is different from the captured image evaluation is an evaluation method in which the blur correction function is evaluated based on the blur correction amount that is calculated from the difference between a blur amount of the image capturing device that was vibrated in a state in which the blur correction function was turned off, and a blur amount of the image capturing device that was vibrated in a state in which the blur correction function was turned on.

12. The image evaluation apparatus according to claim 1, wherein an evaluation method that is different from the captured image evaluation is an evaluation method wherein:
the blur correction amount is calculated from the difference between a blur amount of the image capturing device that was vibrated in a state in which the blur correction function was turned off, and a blur amount of the image capturing device that was vibrated in a state in which the blur correction function was turned on,
the blur amount assumed in a case in which the image capturing device was vibrated is calculated based on the input waveform by using the blur correction amount, and
the blur correction function is evaluated based on the assumed blur amount.

13. The image evaluation apparatus according to claim 1, wherein the vibration detection unit is configured to detect a vibration based on either a vibration detection member that is disposed inside of the image capturing device, a vibration detection member disposed outside of the image capturing device, or a motion vector obtained from the captured image.

14. The image evaluation apparatus according to claim 1, wherein the image capturing device is configured to include an image capturing lens and an image capturing device main body unit, and
wherein the vibration detection unit is disposed at a distal end portion of the image capturing lens.

15. The image evaluation apparatus according to claim 1, wherein the captured image evaluation is an evaluation of the blur correction function based on the blur width of a predetermined portion in an image captured by the image capturing device that has been vibrated in a state in which the blur correction function is turned on.

16. An image evaluation method, comprising:
vibrating an image capturing device that is configured to include a blur correction function based on an input waveform,
detecting a vibration of the image capturing device,
comparing the input waveform with a waveform of a vibration detection result, and
performing a captured image evaluation, which is an evaluation of the blur correction function based on the captured image result of a subject by the image capturing device,
wherein, in a case in which it has been determined that the vibration detection result is within a predetermined range, the captured image evaluation is performed; and
wherein, in a case in which it has been determined that the vibration detection result is outside of the predetermined range, evaluation of the blur correction function by an evaluation method that is different from the captured image evaluation is performed.

17. A non-transitory storage medium on which is stored a computer program which causes a computer to execute an image evaluation method, the method comprising:
vibrating an image capturing device that is configured to include a blur correction function based on an input waveform,
detecting a vibration of the image capturing device,
comparing the input waveform with a waveform of a vibration detection result, and
performing a captured image evaluation, which is an evaluation of the blur correction function based on the captured image result of a subject by the image capturing device,
wherein, in a case in which it has been determined that the vibration detection result is within a predetermined range, the captured image evaluation is performed;
wherein, in a case in which it has been determined that the vibration detection result is outside of the predetermined range, evaluation of the blur correction function by an evaluation method that is different from the captured image evaluation is performed.

* * * * *